(12) United States Patent
Anderson et al.

(10) Patent No.: US 12,309,158 B2
(45) Date of Patent: *May 20, 2025

(54) SYSTEMS AND METHODS FOR ACCESSING CLOUD RESOURCES FROM A LOCAL DEVELOPMENT ENVIRONMENT

(71) Applicant: Atlassian Pty Ltd., Sydney (AU)

(72) Inventors: Shane Anderson, Sydney (AU); Michael Fuller, Sydney (AU); Ashley Bartlett, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,231

(22) Filed: Feb. 5, 2024

(65) Prior Publication Data

US 2024/0244057 A1 Jul. 18, 2024

Related U.S. Application Data

(63) Continuation of application No. 17/847,002, filed on Jun. 22, 2022, now Pat. No. 11,924,214, which is a continuation of application No. 16/503,360, filed on Jul. 3, 2019, now Pat. No. 11,374,934, which is a continuation of application No. 15/694,593, filed on Sep. 1, 2017, now Pat. No. 10,348,735.

(51) Int. Cl.
*H04L 9/40* (2022.01)
(52) U.S. Cl.
CPC ............ *H04L 63/102* (2013.01); *H04L 63/06* (2013.01); *H04L 63/068* (2013.01); *H04L 63/0815* (2013.01); *H04L 63/083* (2013.01)

(58) Field of Classification Search
CPC ..... H04L 63/102; H04L 63/06; H04L 63/068; H04L 63/0815; H04L 63/083
See application file for complete search history.

(56) References Cited

U.S. PATENT DOCUMENTS

| 9,055,055 | B1 | 6/2015 | Strand et al. |
| 9,672,140 | B1 | 6/2017 | Eberlein |
| 10,027,658 | B1 | 7/2018 | Schwarz |

(Continued)

*Primary Examiner* — Joseph P Hirl
*Assistant Examiner* — Thomas A Gyorfi
(74) *Attorney, Agent, or Firm* — Brownstein Hyatt Farber Schreck, LLP

(57) ABSTRACT

A method for accessing cloud resources via a local application development environment on a computing device. The method includes invoking an access management client at the computing device; obtaining an account identifier associated with a user account and communicating the account identifier to an identity platform; receiving an authentication message from the identity platform in response to the identity platform validating the account identifier, the authentication message comprising a role identifier; communicating the authentication message to the cloud platform; receiving security credentials associated with the role identifier from the cloud platform in response to the cloud platform validating the authentication message and the associated role identifier; setting a variable in the local development environment based on the received security credentials for use by the local development environment to request access to one or more resources maintained by the cloud platform.

20 Claims, 4 Drawing Sheets

(56) References Cited

U.S. PATENT DOCUMENTS

| | | | |
|---|---|---|---|
| 10,348,735 B2 | 7/2019 | Anderson et al. | |
| 11,924,214 B2 * | 3/2024 | Anderson | H04L 63/102 |
| 2006/0248577 A1 | 11/2006 | Beghian | |
| 2008/0077809 A1 | 3/2008 | Hayler et al. | |
| 2009/0044020 A1 | 2/2009 | Laidlaw et al. | |
| 2013/0198823 A1 | 8/2013 | Hitchcock | |
| 2014/0075501 A1 | 3/2014 | Srinivasan | |
| 2014/0157434 A1 | 6/2014 | Graves | |
| 2014/0331060 A1 | 11/2014 | Hayton et al. | |
| 2015/0124963 A1 | 5/2015 | McCusker | |
| 2018/0121171 A1 | 5/2018 | Subramaniyan | |

* cited by examiner

SYSTEMS AND METHODS FOR ACCESSING CLOUD RESOURCES FROM A LOCAL DEVELOPMENT ENVIRONMENT

CROSS-REFERENCE TO RELATED APPLICATION(S)

This application is a continuation patent application of U.S. patent application Ser. No. 17/847,002, filed Jun. 22, 2022 and titled "Systems and Methods for Accessing Cloud Resources from a Local Development Environment," which is a continuation patent application of U.S. patent application Ser. No. 16/503,360, filed Jul. 3, 2019 and titled "Systems and Methods for Accessing Cloud Resources from a Local Development Environment," now U.S. Pat. No. 11,374,934, which is a continuation patent application of U.S. patent application Ser. No. 15/694,593, filed Sep. 1, 2017 and titled "Systems and Methods for Accessing Cloud Resources from a Local Development Environment," now U.S. Pat. No. 10,348,735, the disclosures of which are hereby incorporated herein by reference in their entireties.

FIELD

One technical field the present disclosure is computer security in relation to distributed, networked computer resources. Another technical field of the disclosure is authentication, authorization and access control, specifically improvements in providing access to cloud computing resources.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

With the advent of cloud computing platforms, such as Amazon Web Services (AWS), ever more businesses are deploying and hosting their applications and/or services "in the cloud"—i.e., on servers and storage modules maintained by cloud computing platforms. This affords flexibility (as organizations can dynamically increase/decrease storage and/or processing requirements based on utilization) and potentially cost savings (as organizations do not have to maintain or service the underlying hardware resources).

To access or manage resources hosted on cloud computing platforms, a user typically requires a client (for example, a web browser or other client) installed on a computing device that communicates with a cloud platform endpoint to authenticate the user and provide access to cloud resources. The user can then manage the cloud resources via the client.

SUMMARY

The appended claims may serve as a summary of the invention.

Figure 1:
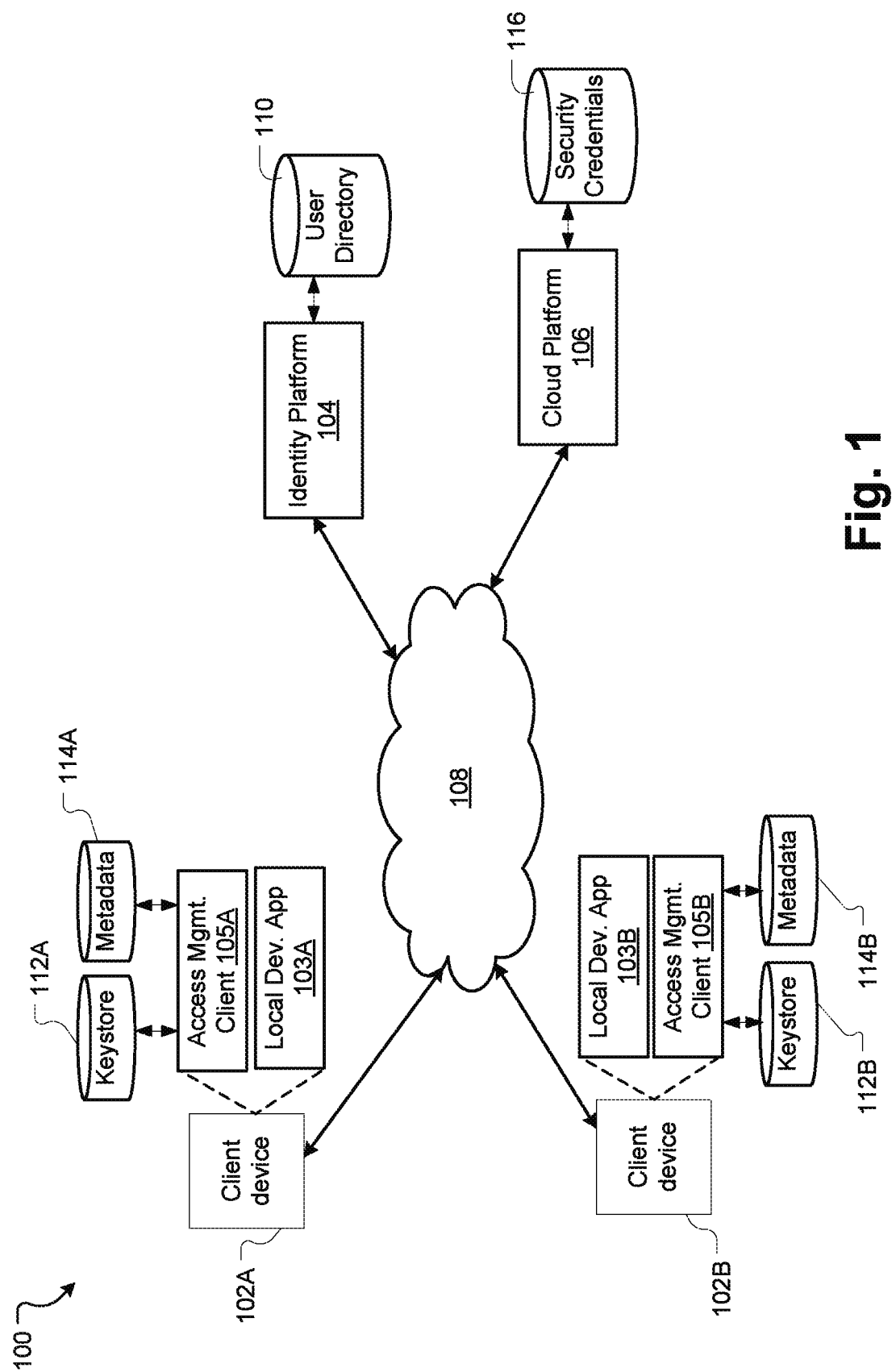
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As used herein, cloud resources refer to services offered by a cloud computing platform. These include, for example, compute resources (for example virtual servers), storage resources, databases, and messaging services.

As used herein, the term application environment refers to the configuration, settings and information made available to a running application.

As used herein, the term application metadata refers to an endpoint that can be queried for information about the application environment.

To access cloud resources, for example, to access an instance associated with a particular cloud platform account, a user is typically required to launch a client, enter an endpoint of the cloud platform, and "login" to the cloud platform using their cloud platform credentials (such as username and password). Once logged in, the user computer can access any resources they have permission to access in the cloud platform. By way of example, the user's client may be a web browser client and the endpoint for accessing the cloud platform may be a URL. This scenario will be used in the following description but alternate clients or endpoints are possible.

To circumvent the need for users to remember their cloud platform credentials, some cloud platforms and organizations may offer federated identities that allow users to access cloud resources based on the user credentials maintained with their organization. Put another way, the user's organization authenticates the user and the cloud platform trusts the organization's authentication and provides access to cloud resources based on this trust.

In federated authentication mechanisms, user credentials maintained by an organization are mapped to certain roles offered by a cloud platform. A role may be associated with a set of permissions that govern the operations a role can perform on the cloud platform. As an example, an organization may assign the role "developer" to its software developers. This role allows any user assigned to the developer role to, for example, access, alter, or modify the organization's cloud resources that are marked as being in a development stage. Similarly, IT administrators in the organization may be assigned the role "admin", which allows the IT administrators to access, update, or modify any of the organization's cloud resources.

To make federated identities work, the organization maintains its own identity store (for example, user directory) that stores user credentials and corresponding roles assigned to each user. When a user wishes to access a particular cloud resource, the user utilizes their organization identifiers (for example, username and password) to gain access to the cloud platform. More specifically, the user's organization compares the user's identifiers with those stored in the identity store to authenticate the user and check whether the user is assigned any roles. Once this check is complete, the organization communicates an authentication confirmation message to the cloud platform, which in turn returns security credentials (for example, a unique access identifier and/or session identifier) associated with the selected user role. The user can then access any cloud resources and/or make API calls corresponding to the role using the received security credentials.

However, these access requests and API call are generally made via a particular web browser or a special client application. Being limited to a web browser or client may be acceptable when a user wishes to manage cloud resources via a dashboard or console (for example). This limitation, though, can be problematic when users wish to develop applications or services. This is because developers often prefer to develop applications in a local environment—for example, via a command line interface or an integrated development environment (IDE)—that offers rich editing and debugging tools, which unfortunately web browsers are unable to match. It is difficult to access cloud resources directly from such command line interfaces or IDE applications with existing solutions. Furthermore, users are unable to run the program, application or service that they are developing in its cloud environment when working locally. Therefore, they usually cannot determine how the application will react or act in the cloud platform before deploying the application in the cloud platform.

To address one of more of these issues, embodiments of the present disclosure disclose an access management system configured to authenticate a user and allow a user or application to access cloud resources from their local developing environment, be it an IDE application or a command line interface. Further, in some embodiments the access management system assists users in locally developing applications intended for cloud deployment, without maintaining a continuous connection with the cloud platform 106. To this end, the access management system includes a database that stores application metadata from which a configurable cloud environment may be queried and/or loaded.

These and other aspects of the present disclosure will be described in detail with reference to FIG. 1, FIG. 2, FIG. 3 in other sections herein. Embodiments are described that provide significant improvements to computer security by providing ways to authenticate a user account, user computer or user credentials and provide access to distributed, networked resources in cloud computing facilities within the context of a local environment. These techniques offer reduced use of network bandwidth, CPU cycles, storage and memory because of the efficiency of the messages, decisions and algorithms that are disclosed.

In this disclosure, when describing some aspects of the access management system, examples are provided in context of the Amazon Web Services (AWS) cloud platform offered by Amazon, Inc. It will be appreciated that these are mere examples and the access management system is not limited to use with AWS. Instead, it can be used with any other cloud platform, such as Microsoft Azure, Google Cloud, Apple Cloud, Cisco Cloud, etc., without departing from the scope of the present disclosure. When used with any of these other cloud platforms, the types of messages, commands, languages, and data formats may vary, but the underlying functionality and process would be substantially similar to that described herein.

Overview of Example Computer System

FIG. 1 illustrates a computing network in which one or more aspects of the present disclosure are implemented.

In an embodiment, FIG. 1 illustrates systems that can be involved in a network 100 in providing access to cloud resources in local development environments and/or in replicating cloud environment parameters for local development. The systems include client devices 102 (for example, client devices 102A, 102B), an identity platform 104, and a cloud platform 106. The client devices 102, identity platform 104, and cloud platform 106 communicate with each other over one or more communication networks 108.

Users of client devices 102 may utilize client devices to develop, access, manage, and/or update applications that are eventually hosted on the cloud platform 106. Further, users may utilize the client devices 102 to access cloud resources or make API calls when developing a software application. The client device 102 may be any suitable device, for example a mobile device (for example a tablet or mobile phone), a portable device (such as laptop computer), or any other computing device (for example a desktop computer).

As illustrated in FIG. 1, each client device 102 may include one or more local development applications 103 (for example, local development application 103A, 103B) and an access management client 105 (for example, access management client 105A, 105B). By way of example, the local development application 103 may be a command line interface or an IDE application. IDE applications typically include all the tools such as source code editors, build automation tools and debuggers required to develop, compile and test software. Command line interfaces on the other hand provide a means of interacting with a computer program/application where the user issues commands to the program in the form of successive lines of text (command lines). Command line interfaces may be used to invoke external build tools and/or debuggers to compile or test software.

In an embodiment, access management client 105 comprises a set of executable program instructions stored in non-transient compute readable media such as memory of the client devices 102 on which it is installed or executes. These instructions are executed by a processor of the client device 102 to perform various functions as described herein. By way of example, some functions performed by the access management client 105 include communicating with the identity platform 104 to authenticate a user of the client device 102, communicate with the user to display a list of roles assigned to the user and receive selection of a role from the user, communicate with the cloud platform 106 to retrieve security credentials to access cloud resources, populate an environment for one or more applications and refresh credentials periodically. These and other functions of the access management client 105 will be described in detail with reference to FIG. 2 and FIG. 3.

In some embodiments, the access management client 105 is also configured to maintain sessions for particular periods of time. For example, it may be configured to maintain a session with the identity platform 104 and another session with the cloud platform 106. In such cases, the access management client 105 maintains a key store 112 for storing user credentials and/or session identifiers. These stored user credentials and/or session identifiers may be used to authenticate users and refresh security credentials received from the cloud platform 106 as described in detail with reference to FIG. 2 and FIG. 3.

To provide a cloud environment for an application when a user is developing the application locally on their client device 102, the access management client 105 may also maintain a metadata database 114 that stores cloud environment variables.

The access management client 105 may be implemented in various ways. For example, the access management client may be an application which accesses the cloud platform 106 and the identity platform 104 via appropriate uniform resource locators (URL) and communicates with these systems via general world-wide-web protocols (for example HTTP, HTTPS, FTP). In this case the access management client 105 is configured to request and unpack messages received from the cloud platform 106 and/or the identity platform 104 that conform to a markup language such as HTML, XML or extensions, and may convert these messages into plain text for internal use. Alternatively, the client application may be a specific application programmed to communicate with the identity platform 104 and/or the cloud platform 106 using defined application programming interface (API) calls.

Generally speaking, the identity platform 104 is configured to authenticate and authorize a user account and assert to a third party system (such as the cloud platform 106) that an identifier (for example, username and password) provided by a user is known to the identity platform 104. The identity platform 104 may also be configured to provide other information about the user to the third party system (such as a list of the cloud platform roles assigned to the user).

To provide authentication and authorization services, the identity platform 104 maintains a user directory 110 for storing identity profiles including, for example, identifiers such as usernames and passwords, email addresses, names, assigned roles, and permissions for users. In some embodiments, the identity platform 104 may be provided by a user's own organization. Alternatively, the identity platform 104 may be a third party identity provider that provides a service a user is registered with (for example, OneLogin, Okta, Centrify, etc.).

In some embodiments, the identity platform 104 communicates with an Active Directory system developed by Microsoft. In other embodiments, the identity platform 104 may authenticate users by utilizing a local user store on the identity platform 104 either in a text file, database or other pluggable authentication modules (PAM) that stores user profiles.

The cloud platform 106 is configured to generate, maintain and distribute security credentials for roles, determine whether access should be provided to a cloud resource, and maintain application metadata. It will be appreciated that in addition to these functions, the cloud platform is configured to perform a multitude of other operations to manage resources (for example, processors and memory) and manage access to these resources. Such operations are not within the scope of the present disclosure and are therefore not described in any detail.

To manage security credentials the cloud computing platform 106 may maintain a security credential database 116 that stores active security credentials and the roles and/or permissions associated with those security credentials.

As illustrated in FIG. 1, communications between the client devices 102, identity platform 104, and cloud platform 106 are via the communications network 108. For example, the client devices 102 may communicate with the, identity platform 104 and the cloud platform 106 through a combination of local area networks (LAN) and/or public networks (for example, the Internet).

It will be appreciated that although only two client devices 102A, 102B have been illustrated, in normal operation, many more client devices 102 may be connected to the identity platform 104 and cloud platform through the network 108.

Example Methods and Algorithms

This section describes methods and algorithms that can be programmed in computers for providing access to cloud resources in local development environments and for loading a local environment for cloud applications.

Figure 2:
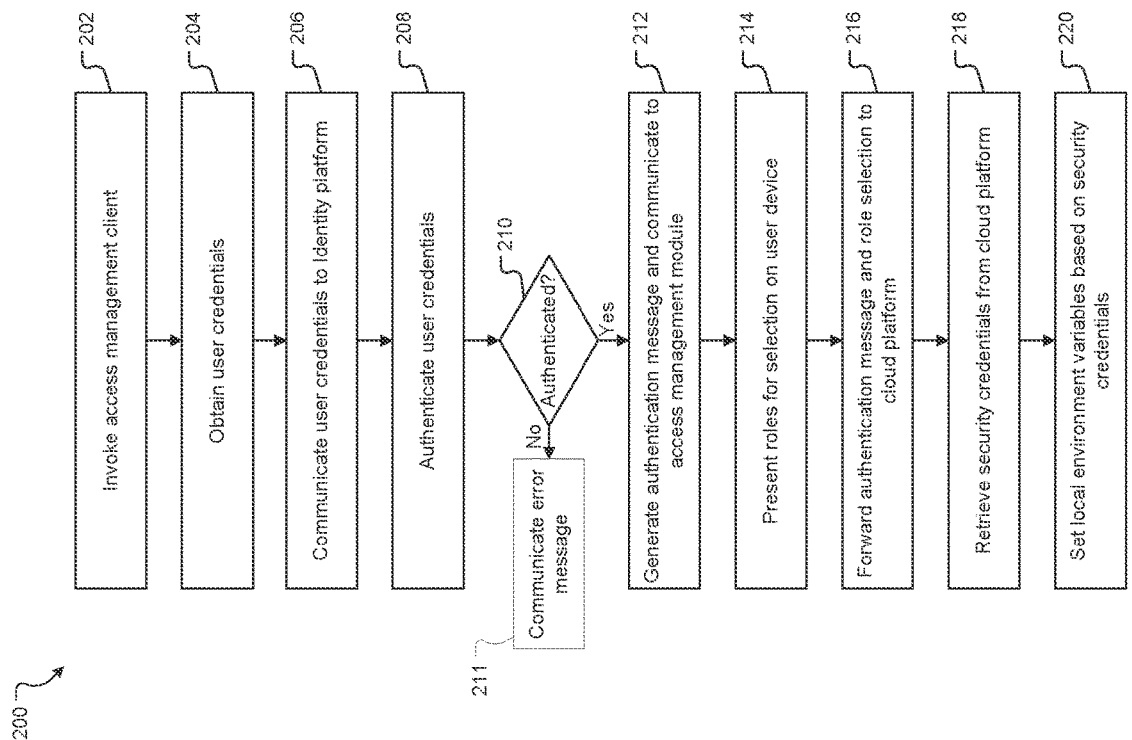
FIG. 2 is a flowchart illustrating a method for providing local access to cloud resources according to some embodiments of the present disclosure.

FIG. 2 is a flowchart illustrating an example method for providing access to cloud resources.

In an embodiment, a method begins at step 202 where the access management client 105 is invoked. In one example, the access management client 105 may be invoked via a command line interface and the appropriate command can be, for example, AWStoken. Alternatively, the access management client 105 may be presented on the client device 102 as a graphical icon and it may be invoked by activating a graphical user interface control such as a button displayed on the display of the client device 102.

Next, at step 204, the access management client 105 obtains an account identifier associated with a user account of the user operating the client device 102. In some embodiments, the account identifier may be in the form of user credentials i.e., the credentials the user has previously registered with the identity platform 104. In its basic form, user credentials may include for example a user name and password. If a higher level of security is implemented by the identity platform 104, the user credentials may include one or more additional factors (for example, answer to a secret question, a one-time code, etc.).

In certain embodiments, where the access management client 105 does not store an account identifier on the client device 102 in any form, the access management client 105 prompts the user to provide their user credentials at this step. This may be done, for example, via a prompt in the local development application, or as a pop-up message.

In other embodiments, where the access management client 105 is configured to store one or more account identifiers in the key store 112, the access management client 105 prompts the user to enter their credentials at the first time that the method 200 is run, and stores these credentials in the key store 112 to be used when the method is run subsequently. In such embodiments, the access management client 105 may create a session identifier (for example, a token or a unique digest) based on session data received from the identity platform 104 (see step 206 below) and store this session identifier in the key store 112.

Three example session identifiers are illustrated below. Although these session identifiers are depicted in textual form to illustrate information in the session identifier, the relevant information need not be textual and could be stored in any appropriate format (for example, a cookie file, an XML file, etc.).

TABLE A

Example Session Identifiers

X-Mapping-ponflfdg 3000A304D1EXAMPLE57258E1460CE5
https://xyz.com/s/1RkEBvFXW3wie/Session 50B
xyzSAMLID 54646b6EXAMPLE4a5e7700fe1b312b9a
https://xyz.com/s/1RkEBvFXW3wie/8/8/2017, 11:25:11PM 47B
xyzSAMLAuthToken_d1ed6d940007290f8baEXAMPLE2200b88a0097
https://xyz/s/1RkEBvFXW3wie / 8/8/2017, 10:08:34 PM 65 B ✓

A session identifier is typically valid for a predetermined duration (for example, 4 hours, 8 hours, 24 hours etc.), after which it expires and/or is deleted. In embodiments where the access management client 105 is configured to create and store session identifiers, the access management client 105 may first check the key store 112 at step 204 to determine whether an active session token exists. If an active session token is present, the access management client 105 does not have to prompt the user to enter their user credentials at step 204. Instead, the access management client 105 retrieves user credentials and/or session identifier from the key store 112.

Once the account identifier is obtained (from the user or the key store 112), the access management client 105 provides the account identifier to the identity platform 104 at step 206. This step may be performed in a number of different ways, depending mainly on the particular identity platform 104 utilized.

In one particular embodiment, where the identity platform 104 hosts a login page, the access management client 105 requests the identity platform 104 to return the login page. When the identity platform 104 returns the requested login page, the access management client 105 uses the login page to submit the obtained account identifier (for example, user credentials or session identifier) to the identity platform 104. Furthermore, at this stage, if the access management client 105 is configured to maintain sessions, it can also gather session data from the login process and store the relevant session identifier as described above.

Next (at step 208), the identity platform 104 authenticates the user. When session identifiers are not present, this is done by comparing the user credentials supplied by the access management client 105 via the login page with user credentials stored in the user directory 108. Alternatively, when a session identifier is present (for example, in case the user has been authenticated by the identity platform 104 in a previous predetermined time period) the identity platform 104 may authenticate the user by validating the session identifier supplied by the access management client 105.

At step 210, the identity platform 104 determines whether authentication was successful. If the supplied account identifier (i.e., user credentials or session identifier) does not match a corresponding stored account identifier, the identity platform 104 determines that authentication was unsuccessful and the identity platform 104 communicates an error message to the access management client 105 informing it that the account identifier is incorrect or has expired (step 211). The access management client 105 may subsequently request the user to re-enter the user credentials for the corresponding user account and if the identity platform 104 is unable to authenticate the user credentials in a predetermined number of retries (for example, three times), the access management client 105 may end the process at this step.

Alternatively, if the supplied account identifier matches that stored in the identity platform 104 (for example, if the user credentials match those stored in the user directory 108 or the session identifier matches that stored in a data structure such as a session table), a determination is made that authentication was successful and at step 212 the identity platform 104 creates an authentication message indicating that the user has been authenticated. The identity platform 104 also retrieves a list of roles assigned to the authenticated user from the user directory 110 and includes this list of roles in the authentication message at this step before communicating the authentication message to the access management client 105.

In one embodiment, if the identity platform 104 and cloud platform 106 utilize the Security Assertion Markup Language (SAML) data format for exchanging authentication and authorization data, the authentication message may be in the form of a SAML assertion. SAML is an XML-based, open-standard data format for exchanging authentication and authorization data between parties, in particular, between an identity provider and a service provider via assertions. An assertion is typically a package of information that supplies one or more statements made by the identity platform 104. For example, the SAML assertion can indicate that the user was authenticated by a particular means at a particular time and can include a list of cloud platform roles assigned to the user. To indicate "trust", the identity platform 104 may digitally sign the assertion.

It will be appreciated that in other embodiments, the identity platform 104 and cloud platform 106 may utilize a different authentication standard. In such cases, the message may be in a correspondingly different data format. For example, if the OAuth authentication standard is employed, the message may be in the form of an OAuth token.

Returning to method 200, at step 214, the access management client 105 receives and unpacks the authentication message received from the identity platform 104. This involves retrieving the list of roles assigned to the user, presenting the list on a display of the user device 102, and prompting the user to select one or more roles from the list that the user wishes to assume.

Upon receiving selection of a role, the access management client 105 is configured to forward the authentication message and role selection to the cloud platform 106 at step 216. It will be appreciated that unpacking the authentication message, retrieving and displaying the roles, and receiving a user selection are optional and these steps can be skipped if a single role is assigned to the user. Further, in case the SAML data format is used, the access management client 105 communicates the SAML assertion received from the identity platform along with the role selected by the user to the identity platform 106.

At step 218 in response to receiving the authentication message and role selection, the cloud platform 106 validates the authentication message and returns security credentials associated with the selected role to the access management client 105.

Security credentials are managed by the cloud platform 106 and are associated with a set of permissions for accessing resources on the cloud platform 106. These credentials are provided to a requesting party so that the requesting party can use the credentials when requesting access to cloud resources. Put another way, each time a user or application requests access to a cloud resource, the user or application returns the security credentials received at step 218 to the cloud platform 106 as part of a resource request. At the cloud platform 106, the received security credentials are matched with stored security credentials to determine whether the requesting party has permission to access the requested cloud resource. For example, if an application/user wishes to download a specific file from a storage device hosted by the cloud platform 106, the application/user sends a resource access request to the cloud platform along with the security credentials retrieved at step 218. The cloud platform 106 then compares the received security credentials with those stored on the cloud platform 106 and identifies permissions associated with those security credentials. This may be done via a lookup. If the provided credentials don't match the credentials required to access that specific file (for example, because the selected role is not allowed to access the resource, or the credentials have expired), the cloud platform 106 denies access to the file. Alternatively, if the cloud platform determines that the provided credentials match the credentials and the selected role is allowed to download the file, access is granted to the file.

The security credentials may be long-term or temporary (i.e., valid of a predetermined period of time). Long-term security credentials, as the name suggests do not change or expire over time and a user can reuse the same security credentials when access is required to resources that the credentials provide permission for. Where long-term security credentials are used, once the security credentials are retrieved from the cloud platform for a particular role, the access management client 105 can store the credentials and reuse them over time.

Temporary security credentials work in a similar fashion to long-term security credentials but are valid for a short-term (for example, anywhere from a few minutes to several hours). After the temporary credentials expire, the cloud platform 106 no longer recognizes them or allows any kind of access from API requests made with these credentials. Accordingly, when temporary security credentials are employed, the access management client 105 requests the cloud platform to provide new security credentials (as described in method 400 below) if the user session is active or via method 200 if the user session has expired.

An example temporary security credential is illustrated in Table B below. Although a table has been used to illustrate information associated with the temporary security credential, the relevant information need not be received in a table and could be received in any appropriate format (for example a simple text file, a JSON file, an XML file).

TABLE B

Example temporary security credentials

| | |
|---|---|
| Role name | AWS_Developer |
| Expiration timestamp | 2017-06-13T06:09:20Z |
| Session token | AQoEXAMPLEH4aoAH0gNCAPyJxz4BlCFFxWNE1O PTgk5TthT+FvwqnKwRcOIfrRh3c/LTo6UDdyJwOOvEV PvLXCrrrUtdnniCEXAMPLE/IvU1dYUg2RVAJBanLiHb 4IgRmpRV3zrkuWJOgQs8IZZaIv2BXIa2R4OlgkBN9bk UDNCJiBeb/AXIzBBko7b15fjrBs2+cTQtpZ3CYWFXG 8C5zqx37wnOE49mRl/+OtkIKGO7fAE |
| Secret access key | wJalrXUtnFEMI/K7MDENG/bPxRfiCYEXAMPLEKEY |
| Access key identifier | AKIAIOSFODNN7EXAMPLE |
| Account identifier | 15345641323489 |
| Last updated | 2017-06-13T05:09:20Z |

In the example security credential, the following information is provided:

The name of the role selected at step 214.

An expiration timestamp. The value of this timestamp indicates the time when the credentials will expire (in this case one hour from when the credentials were requested).

A session token/delegation token/security token, used by the cloud platform to validate the temporary security credentials when the credentials are returned to the cloud platform.

A secret access key and access key identifier to determine whether the security credentials are authorized to provide access to the particular cloud resource access is requested for.

Account identifier which refers to the cloud platform ID that is being accessed.

A last updated field that indicates when the temporary credentials were created.

Returning to FIG. 2, at step 220, the access management client 105 sets one or more local environment variable in the local development environment based on the security credentials retrieved from the cloud platform 106. For example, if the local development application is a command line interface application with a shell, the access management client 105 can set the security credentials in the environment variables of the support shell. Examples of support shells include BASH, ZSH, and FISH. The local development application 103 can then use these credentials when requesting access to a cloud resource and/or making an API call.

In some cases, a user may wish to simply access a cloud resource or make an API call to the cloud platform 106 while developing an application. In these cases, the method 200 ends at step 216. In other cases, the user may wish to develop some functionality in the application that affects how the application interacts with the cloud environment. For example, a developer may develop an application deployment or configuration script that requires access to cloud environment parameters to run. In such cases, the user typically has to run the script in the cloud platform 106 to determine how it interacts with the cloud environment.

In order to allow users to locally work on applications/scripts that require interaction with the cloud environment, the disclosed access management client 105 replicates the application's cloud environment on the user's client device 102. This is done by including a local store of an application's environment variables in the metadata database 114 and providing a local endpoint to the metadata database 114. When the application/user needs to query the metadata for an application environment variable, the application can query the endpoint of the local metadata database 114, from where the requested information is retrieved. The access management client 105 may also store the security credentials in the metadata database 114 so that a local development application 103 can query the metadata database 114 for the security credentials when required.

In this manner, the cloud environment can be replicated on the client device 102 even if it is not connected to the cloud platform 106.

Examples of environment variables stored in the local metadata database 114 include an instance size, an instance hostname, an instance ID, a network identifier, a data center identifier of the data center the instance is located in, etc. Table C below shows an example metadata data structure maintained by the access management client 105.

TABLE C

Example metadata data structure

| Environment Variable | Value |
|---|---|
| Ami-id | ami-ec6e5584 |
| ami-launch-index | 0 |
| ami-manifest-path | (unknown) |
| block-device-mapping | ephemeral0 |
| hostname | ip-10-158-112-10.aws-east1.example.com |
| iam | 'info' →Code: 'Success' LastUpdated:2016-08-16T08:57:18Z' InstanceProfileArn:'arn:aws:iam::112233445566: instance-profile/blah'    InstanceProfileId: 'AIPALICRLXXXXYXXXONXO' |
| instance-action | none |
| instance-id | eni-0011aabb |
| instance-type | t1.micro |
| kernel-id | aki-919dcaf8 |
| local-hostname | ip-10-158-112-10.aws-east1.example.com |
| local-ipv4 | 10.158.112.10 |
| Mac | 12:99:4c:9f:6e:5c |
| Metrics | 'vhostmd' → <?xml version=\"1.0\" encoding=\"UTF-8\"?> |
| 'network' 'placement' | us-east-1a |
| Profile | default-paravirtual |
| Services | domain partition '/meta-data/services/domain': 'amazonaws.com' '/meta-data/services/partition': 'aws' |

In this example, the cloud platform is considered to be Amazon Web Services (AWS), so the variables are specific to the environment variables made available by AWS. It will be understood that when different cloud platforms are used, the environment variables may be different to those depicted in table C and specific to the particular cloud platform used.

In some embodiments, the values stored in the metadata database 114 are default values and a user may configure or amend these values to alter the environment settings of an application.

If a user wishes to utilize or query environment data while developing an application locally, the user may inform the access management client 105 that environment settings are required. In this case, the access management client 105 may keep running as a daemon program in the background while the command line interface is in use or until the user requests the access management client 105 to stop the daemon program. In an example, the daemon program may be invoked by entering the flag/command "-daemon" in a command line interface. Alternatively, the daemon program may be presented on the client device 102 as a graphical icon and it may be invoked by activating a graphical user interface control such as a button displayed on the display of the client device 102.

In daemon mode, the user or one or more applications running in the local development environment can query the metadata database 114 for security credentials (.for example, in the form of security credential requests) and/or environment variables (for example, in the form of variable requests) and also request access to cloud resources.

In some cases, users would be unable to continue working in daemon mode beyond the expiry period of temporary security credentials if temporary credentials were used. This is because users or applications would be unable to request access to cloud resources or make API calls once the temporary credentials expire. To counter this, when the client is operating in daemon mode, the access management client 105 is configured to automatically refresh temporary security credentials stored in the metadata store before they expire.

Figure 3:
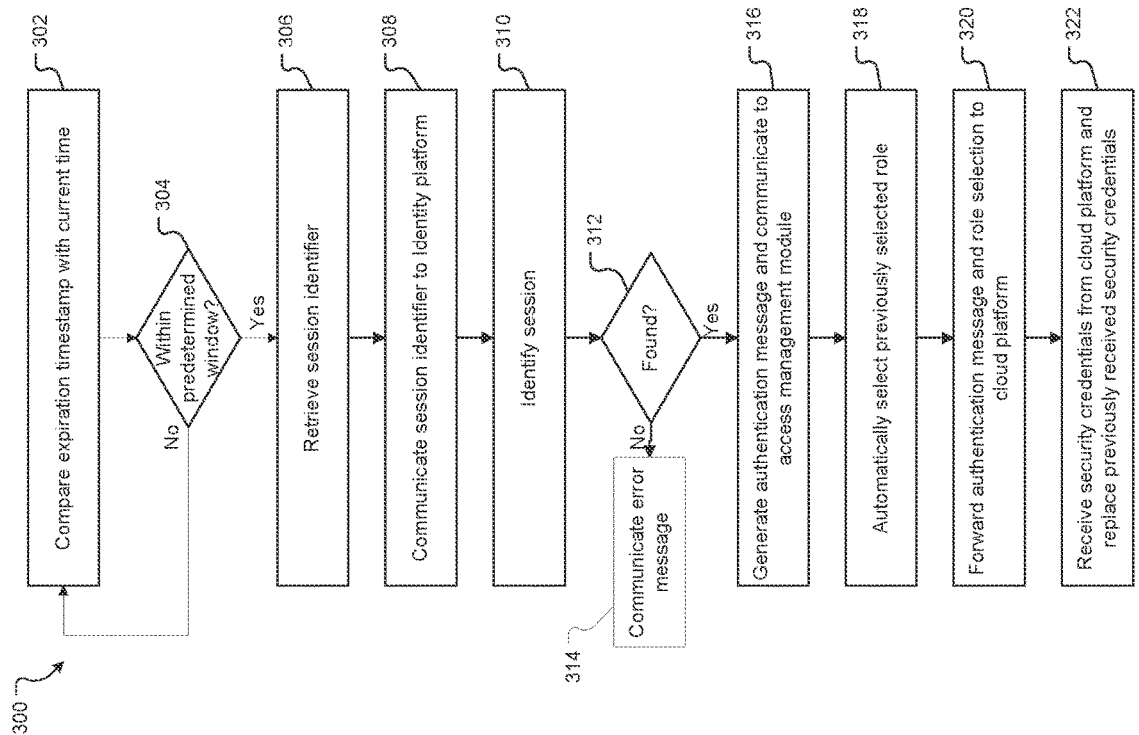
FIG. 3 is a flowchart illustrating a method for refreshing temporary security credentials according to some embodiments of the present disclosure.

FIG. 3 illustrates an example method for automatically (i.e., without user interaction) refreshing temporary security credentials.

The method begins at step 302, where the access management client 105 compares the expiration timestamp of the temporary security credentials with the current time. At step 304 a determination is made whether the expiration timestamp time is within a predetermined time window (for example, 15 minutes) of the current time.

If it is determined that the expiration timestamp time is not within the predetermined time window, the method returns to step 302. In some instances the method may return to step 302 after a predetermined delay.

On the other hand, if it is determined that the expiration timestamp time is within the predetermined time window of the current time, the method proceeds to step 306, where a session identifier for the access management client 105 is retrieved from the key store 112. As noted previously, a session identifier is created for the session between the access management client 105 and the identity platform when the user is first authenticated (see method 200 above).

At step 308, the access management client 105 communicates this session identifier to the identity platform 104. The identity platform 104 in turn compares the received session identifier with corresponding session identifiers stored in the identity platform 104 to identify the session and the corresponding user account associated with the session at step 310.

If the session identifier does not match a stored session identifier at the identity platform 104, the identity platform 104 generates an error message and communicates this to the access management client 105 (step 314). An error message may be generated for example because the session identifier is incorrect or because the session has expired.

If the session identifier matches a stored session identifier and the identity platform identifies a corresponding user, the identity platform generates an authentication message at step 316 (similar to the authentication message generated at step 212 of method 200, which includes authentication confirmation and a list of roles assigned to the user). This authentication message is then communicated back to the access management client 105.

At step 318 the access management client 105 selects the role that was selected by the user at step 214 of method 200 and forwards the authentication message and role selection to the cloud platform 106 at step 320.

The cloud platform 106 validates the authentication message and selected role, generates new temporary credentials for the role, and communicates the new temporary credentials to the access management client 105.

Finally, at step 322, the access management client 105 stores the new temporary credentials and deletes the previously received temporary credentials.

The method then returns to step 302, where the access management client 105 compares the expiration timestamp of the newly received temporary credentials with the current time and repeats process 300 when the expiration timestamp time is within the predetermined time window of the current time.

Implementation Example—Hardware Overview

The operations/techniques described herein are implemented by one or more special-purpose computing systems or devices. For example, in environment 100: the identity platform 104 and the cloud platform 106 may be provided by one or more computer systems; and each client device 102 is a computer system.

The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 4:
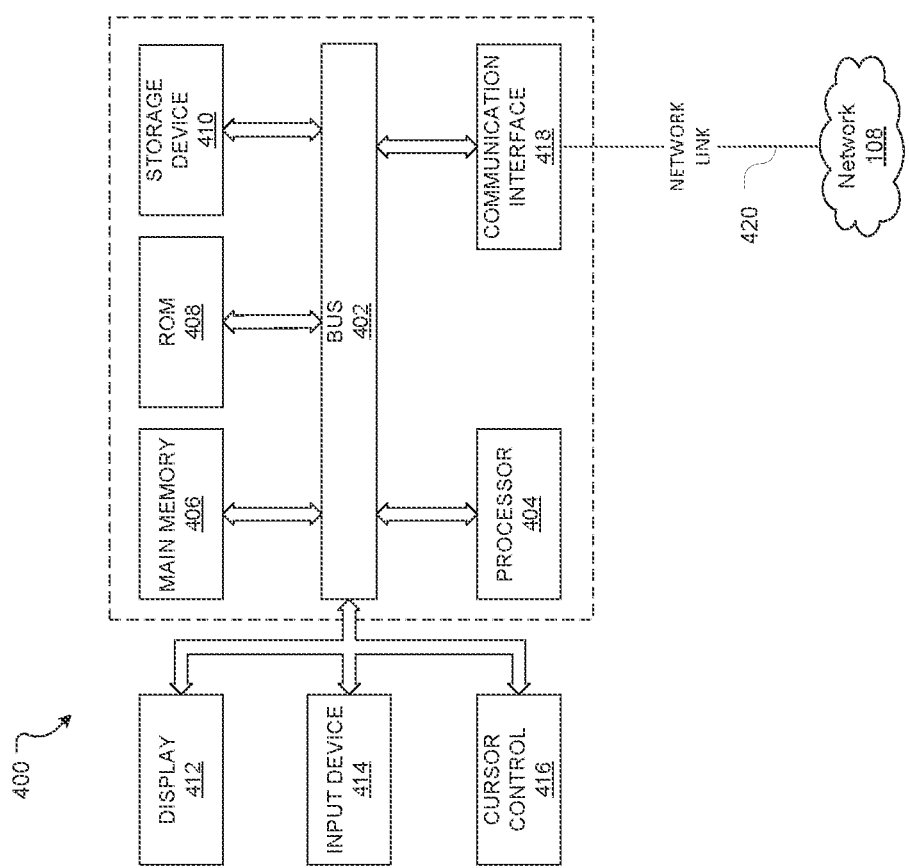
FIG. 4 is a block diagram of a computing system with which various embodiments of the present disclosure may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. If the computer system 400 is part of the cloud platform 106, the storage device 410 may store credential database 116.

In case the computer system 400 is the client device 102, it may be coupled via bus 402 to one more output devices such as a display 412 for displaying information to a computer user. Display 412 may, for example, be a cathode ray tube (CRT), a liquid crystal display (LCD), a light emitting diode (LED display), or a touch screen display. An input device 414, including alphanumeric and other keys, may be coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that permits the device to specify positions in a plane. Additional and/or alternative input devices are possible, for example touch screen displays.

According to one embodiment, the methods disclosed herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to network 108. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 420 typically provides data communication through one or more networks 108 to other computing systems. For example, if the computing system 400 is part of the identity platform 104, the network link 420 may provide a connection through network 108 to client device 102 or cloud platform 106.

Computer system 400 can send messages and receive data, including program code, through the network(s), network link 420 and communication interface 418. In the identity platform example, the identity platform 104 may receive user credentials through the network 108 and communication interface 418 from the client device 102.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A method for authorizing access to a set of cloud-based services of a cloud platform, the method comprising, by:
obtaining an account identifier associated with a user account for a user of the cloud platform;
transmitting, to an identity platform, a first authentication message requesting security credentials for the user, the first authentication message including a role identifier managed by the cloud platform, and the identity platform being separate from the cloud platform and managed by an entity different than an entity managing the cloud platform;
in response to the first authentication message being validated, receiving the security credentials from the cloud platform;
storing the security credentials at an access management client;
using the security credentials to access one or more resources maintained by the cloud platform;
determining whether a predetermined period of time has expired;
in response to determining that the predetermined period of time has expired, refreshing the security credentials by:
obtaining the account identifier associated with the user account;
communicating the account identifier to the identity platform;
receiving a second authentication message from the identity platform;
in response to receiving the second authentication message, communicating the second authentication message to the cloud platform along with the role identifier; and
in response to communicating the second authentication message to the cloud platform, receiving new security credentials associated with the role identifier from the cloud platform; and
using the new security credentials to access the one or more resources maintained by the cloud platform.

2. The method of claim 1, further comprising:
replicating at least a portion of a cloud-based environment on a client device associated with the access management client in accordance with content permissions corresponding to the role identifier received from the client device.

3. The method of claim 1, wherein:
the security credentials received from the identity platform include an expiration timestamp for the security credentials; and
determining whether the predetermined period of time has expired comprises identifying that a time indicated by the expiration timestamp has passed.

4. The method of claim 1, wherein refreshing the security credentials comprises:
automatically refreshing the security credentials after the predetermined period of time.

5. The method of claim 1, wherein the security credentials being validated comprises comparing a first authentication token provided in the security credentials with a second authentication token stored at the cloud platform.

6. The method of claim 1, wherein using the new security credentials to access the one or more resources maintained by the cloud platform comprises:
setting a variable in a local development environment based on the new security credentials for use by the local development environment to request access to the one or more resources maintained by the cloud platform.

7. The method of claim 1, wherein the account identifier is at least one of user credentials or a session identifier identifying a pre-existing session between the user account and the identity platform.

8. A method for authorizing access to a set of cloud-based services of a cloud platform, the method comprising:
providing, to an identity platform, an account identifier associated with a user account for a user of the cloud platform;
receiving, from the identity platform, a first authentication message providing security credentials for the user account, the first authentication message including a role identifier managed by the cloud platform, and the identity platform being separate from the cloud platform and managed by an entity different than an entity managing the cloud platform;
accessing, using the using the security credentials, one or more resources maintained by the cloud platform;

subsequent to accessing the one or more resources and in response to determining that a predetermined period of time has expired, refreshing the security credentials by:
  obtaining a second authentication message from the identity platform using the account identifier; and
  in response to providing the second authentication message to the cloud platform, obtaining new security credentials associated with the role identifier; and
using the new security credentials to access the one or more resources maintained by the cloud platform.

9. The method of claim 8, wherein obtaining the second authentication message comprises:
  communicating the account identifier to the identity platform; and
  in response to the identity platform validating the account identifier, receiving the second authentication message from the identity platform.

10. The method of claim 8, wherein obtaining the new security credentials comprises:
  in response to receiving the second authentication message, communicating the second authentication message to the cloud platform along with the role identifier;
  validating, by the cloud platform, the second authentication message and the role identifier;
  in response to the second authentication message being validated, generating, by the cloud platform, the new security credentials associated with the role identifier; and
  providing the new security credentials to an access management client.

11. The method of claim 8, wherein using the new security credentials comprises:
  replicating at least a portion of a cloud-based environment on a client device associated with an access management client in accordance with content permissions corresponding to the role identifier received from the client device.

12. The method of claim 8, wherein:
  the security credentials received from the identity platform include an expiration timestamp for the security credentials; and
  determining whether the predetermined period of time has expired comprises identifying that a time indicated by the expiration timestamp has passed.

13. The method of claim 8, wherein refreshing the security credentials comprises:
  automatically refreshing the security credentials after the predetermined period of time.

14. The method of claim 8, wherein the security credentials are automatically refreshed upon determining that an expiration timestamp associated with the security credentials has expired.

15. The method of claim 8, wherein using the new security credentials to access the one or more resources maintained by the cloud platform comprises:
  setting a variable in a local development environment based on the new security credentials for use by the local development environment to request access to the one or more resources maintained by the cloud platform.

16. An access management client comprising one or more first processors and one or more non-transitory computer-readable data storage media storing instructions which are programmed and executed using the one or more first processors, to:
  obtain an account identifier associated with a user account for a user of a cloud platform;
  transmit, to an identity platform, a first authentication message requesting security credentials for the user, the first authentication message including a role identifier managed by the cloud platform, and the identity platform being separate from the cloud platform and managed by an entity different than an entity managing the cloud platform;
  in response to the first authentication message being validated, receive the security credentials from the identity platform;
  store the security credentials at the access management client;
  determine whether a predetermined period of time has expired;
  in response to determining that the predetermined period of time has expired:
    obtain the account identifier associated with the user account;
    communicate the account identifier to the identity platform;
    receive a second authentication message from the identity platform;
    in response to receiving the second authentication message, communicate the second authentication message to the cloud platform along with the role identifier; and
    in response to communicating the second authentication message to the cloud platform, receive new security credentials associated with the role identifier from the cloud platform; and
  use the new security credentials to access one or more resources maintained by the cloud platform.

17. The access management client of claim 16, wherein the security credentials include an expiration timestamp for the security credentials; and
  determining whether the predetermined period of time has expired comprises identifying that a time indicated by the expiration timestamp has passed.

18. The access management client of claim 16, wherein refreshing the security credentials comprises:
  automatically refreshing the security credentials after the predetermined period of time.

19. The access management client of claim 16, wherein the security credentials being validated comprises comparing a first authentication token provided in the security credentials with a second authentication token stored at the cloud platform.

20. The access management client of claim 16, wherein using the new security credentials to access the one or more resources maintained by the cloud platform comprises:
  setting a variable in a local development environment based on the new security credentials for use by the local development environment to request access to the one or more resources maintained by the cloud platform.

* * * * *